United States Patent [19]

Takano

[11] Patent Number: 4,556,134

[45] Date of Patent: Dec. 3, 1985

[54] POWER TRANSMISSION SYSTEM FOR A FOUR-WHEEL DRIVE VEHICLE

[75] Inventor: Toshio Takano, Hamuramachi, Japan

[73] Assignee: Fuji Jukogyo Kabushiki Kaisha, Tokyo, Japan

[21] Appl. No.: 461,332

[22] Filed: Jan. 27, 1983

[30] Foreign Application Priority Data

Jan. 29, 1982 [JP] Japan ................................ 57-13555

[51] Int. Cl.[4] ..................... F16D 25/14; F16D 43/284
[52] U.S. Cl. .................. 192/103 F; 180/233; 192/3.58; 192/103 R
[58] Field of Search ............... 192/0.033, 3.58, 103 R, 192/85 R, 103 F; 180/233, 247, 197; 361/242, 238

[56] References Cited

U.S. PATENT DOCUMENTS

| | | | |
|---|---|---|---|
| 1,635,236 | 7/1927 | Tolson | 180/247 |
| 3,433,319 | 3/1969 | McLean | 180/247 |
| 3,841,423 | 10/1974 | Holtkamp et al. | 180/247 |
| 4,236,595 | 12/1980 | Beck et al. | 180/247 |
| 4,407,387 | 10/1983 | Lindbert | 180/247' |
| 4,417,641 | 11/1983 | Kageyama | 180/233 X |
| 4,433,748 | 2/1984 | Satoh et al. | 180/247 |
| 4,467,886 | 8/1984 | DeClaire et al. | 180/197 |
| 4,481,877 | 11/1984 | Takano et al. | 180/233 |

*Primary Examiner*—Rodney H. Bonck
*Attorney, Agent, or Firm*—Martin A. Farber

[57] ABSTRACT

A system for a four-wheel drive vehicle automatically changes a two-wheel driving system to a four-wheel driving system in accordance with a slipping rate between the wheels. The system is provided with a pressure oil operated clutch for transmitting the power of the engine to auxiliary driving wheels. The clutch is engaged by pressure oil supplied by a pressure oil circuit including a solenoid operated valve. An electric circuit comprising a control device is provided for energizing the solenoid. The control device operates to close the electric circuit in dependency on the slipping rate to energize the solenoid. The energization of the solenoid causes the clutch to engage, so that four-wheel driving power transmission system is established. A manual switch is provided for opening the electric circuit.

6 Claims, 2 Drawing Figures

POWER TRANSMISSION SYSTEM FOR A FOUR-WHEEL DRIVE VEHICLE

BACKGROUND OF THE INVENTION

The present invention relates to a system for a four-wheel drive vehicle in which the power transmission system is automatically changed from two-wheel drive to four-wheel drive or vice versa in accordance with driving conditions. Such a four-wheel drive vehicle is provided with a clutch for transmitting the power of an engine to two auxiliary driving wheels for establishing the four-wheel drive.

There has been proposed the four-wheel drive vehicle, a power transmission system of which is automatically changed from two-wheel driving to four-wheel driving system in accordance with driving conditions.

The four-wheel drive vehicle is provided with a slip rate detecting device which detects difference between the speed of the front wheels and rear wheels. If either the front wheels or the rear wheels slip on slippery or icy or snowy roads, the slip rate will increase, which is detected by the slip rate detecting device. The clutch is engaged in dependency on a signal from the slip detecting device, so that the vehicle is driven by all four wheels. Thus, slipping of the wheels decreases and safety of driving may be insured.

However, it is desirable for such a four-wheel drive vehicle to be able also to be driven by all four wheels regardless of the driving conditions. To meet such a requirement, a manual switch for changing from an automatically changeable four-wheel-driving transmission system to a constant four-wheel-driving transmission system is necessary.

On the other hand, during periodical inspections with respect to structure of the vehicle, engine performance, the emission control system, and other components, the main driving wheels are mounted on a free roller and the auxiliary driving wheels are fixed. However, the four-wheel drive vehicle provided with the above described automatic four-wheel drive power transmission system cannot be inspected on the free wheel when fixing the auxiliary driving wheels, because the auxiliary driving wheels are driven by the operation of the slip rate detecting device.

SUMMARY OF THE INVENTION

The object of the present invention is to provide an automatical four-wheel drive power transmission system, in which the clutch for the auxiliary driving wheels can be disengaged by operating a switch in order to carry out inspection of the vehicle.

According to the present invention, there is provided a system for a four-wheel drive vehicle for automatically changing a transmission system for a two-wheel driving system to a four-wheel driving system upon occurrence of at least a predetermined speed difference between the wheels. The system is provided with a hydraulic circuit for supplying oil to a pressure oil operated clutch for transmitting the power of the engine to auxiliary driving wheels for the four wheel drive condition. The clutch is engaged by pressure oil supplied by a pressure oil circuit including a solenoid operated valve. An electric circuit comprising a control device is provided for energizing the solenoid. The control device operates to close the electric circuit in dependency on the predetermined speed difference to energize the solenoid. The energization of the solenoid causes the clutch to engage, so that four-wheel driving power transmission system is established. A manually operated change-over switch is provided for closing said electric circuit independent of said control device so as to energize said solenoid so as to close said hydraulic circuit to engage said clutch. A manual cut-off switch is provided for disconnecting the electric circuit during inspection of the vehicle.

The present invention will be more apparent from the following description made with reference to the accompanying drawings.

DETAILED DESCRIPTION OF THE PREFERRED EMBODIMENTS

Figure 1:
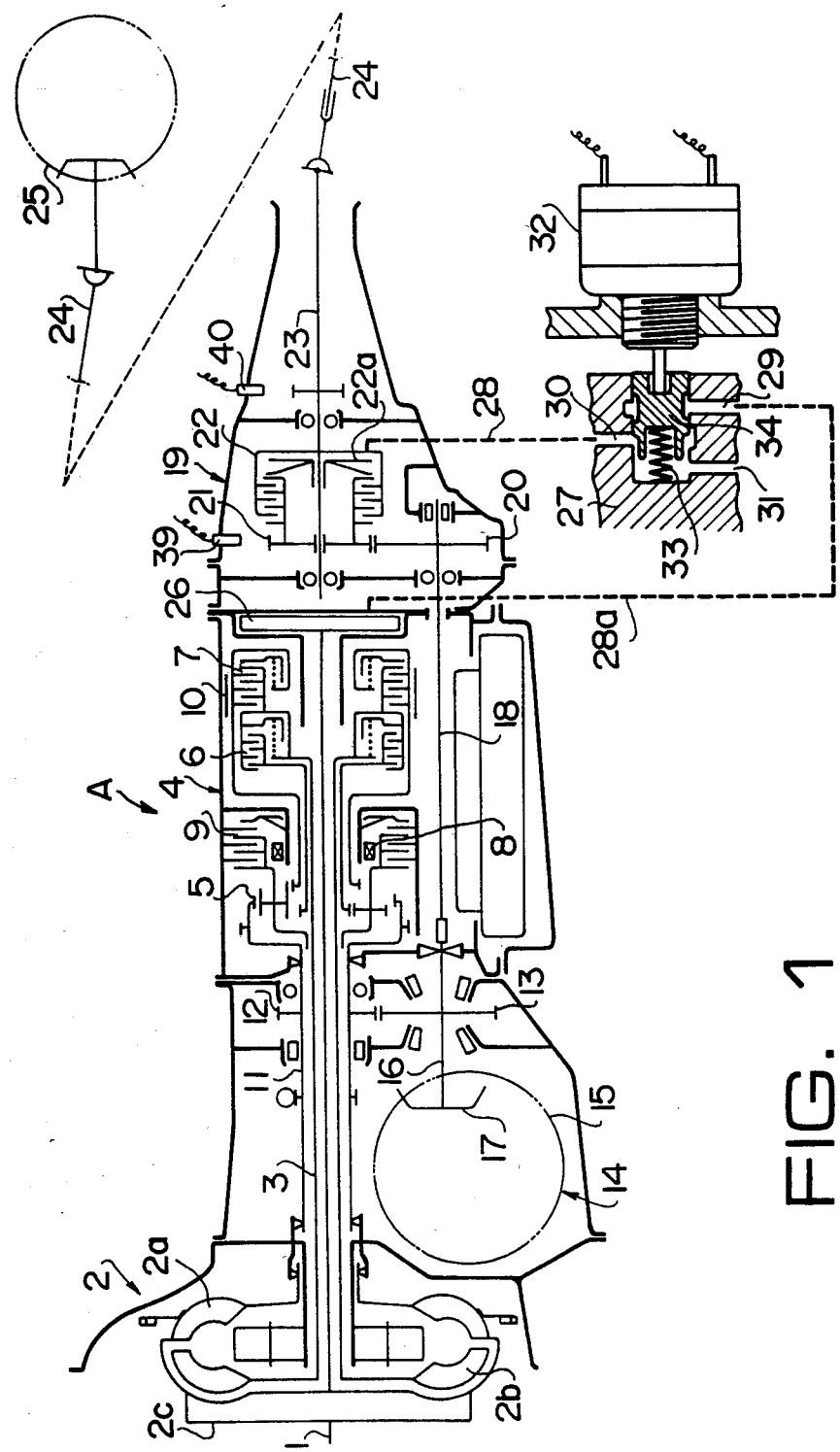
FIG. 1 is a schematic view showing an automatic four-wheel drive power transmission system according to the present invention.

Referring to FIG. 1, a crankshaft 1 of an internal combustion engine (not shown) mounted on a front portion of a vehicle is operatively connected with a torque converter 2 of an automatic transmission A.

The automatic transmission A comprises the torque converter 2, an automatic transmission device 4, and a final reduction device 14 for front wheels of the vehicle.

The torque converter 2 comprises a pump impeller 2a and a turbine 2b. The pump impeller 2a is in direct connection with the engine crankshaft 1 through a drive plate 2c. A turbine shaft 3 extends from the turbine 2b to the automatic transmission device 4.

The automatic transmission device 4 comprises a planetary gear 5, clutches 6 and 7 for selectively transmitting the output of the turbine shaft 3 to the planetary gear 5, a one-way clutch 8, a brake 9 and a brake band 10 for selectively locking elements of the planetary gear 5.

The output of the automatic transmission device is transmitted to an output shaft 11 on which a drive gear 12 is securely mounted for joint rotation and which in turn engages with a driven gear 13. The driven gear 13 is securely mounted for joint rotation on a shaft 16, on one end of which a drive pinion 17 is formed. The drive pinion 17 engages with a crown gear 15 of the final reduction device 14 for the front wheels. The other end of the shaft 16 is connected to a transfer drive shaft 18 which extends rearwardly and is connected to a first transfer gear 20 of a transfer device 19. The first transfer gear 20 is engaged with a second transfer gear 21. The second transfer gear 21 is rotatably mounted on a rear drive shaft 23. A pressure oil operated friction clutch 22 of the multiple-disk type is mounted on the rear drive shaft 23 for engaging the gear 21 with the shaft 23. The rear drive shaft 23 is further operatively connected to a final reduction device 25 for rear wheels through a propeller shaft 24.

A pressure chamber 22a of the clutch 22 is communicated with an oil pump 26 through a passage 28a, solenoid-operated change-over valve 27 and a passage 28. The change-over valve 27 has an inlet port 29 connected to the oil pump 26, an outlet port 30 connected to the pressure chamber 22a, and a drain port 31.

A spool 34 is connected to a solenoid 32 and biased by a compression spring 33 to the right. When the solenoid 32 is de-energized, the spool 34 is pushed by the spring 33 to close or disconnect the inlet port 29 and to communicate the outlet port 30 with the drain port 31 as shown in FIG. 1. By draining the pressure chamber 22a, the clutch 22 disengages. When the solenoid 32 is energized, the spool 34 is shifted to the left against the biasing of the spring 33 to close or disconnect the drain port 31 and to communicate the pressure chamber 22a with the oil pump 26 through the passage 28, ports 30, 29 and passage 28a. Thus, the clutch 22 engages, thereby connecting the gear 21 with the shaft 23 to activate the four-wheel drive power transmission system.

Figure 2:
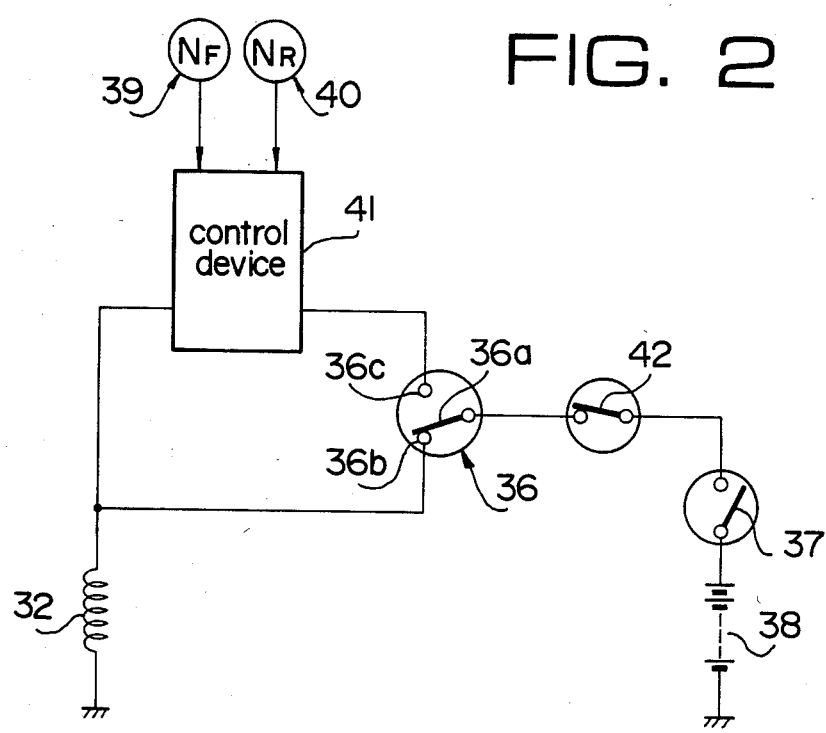
FIG. 2 is a schematic diagram showing an electric circuit provided in the system of the present invention.

Referring to FIG. 2, the electric circuit is to control the current for the solenoid 32 and comprises a manual change-over switch 36, manual cutoff switch 42, and ignition switch 37 which are connected to a battery 38 which is grounded in series. The change-over switch 36 is attached to a suitable portion, for example to a select lever (not shown) for the automatic transmission A. The change-over switch 36 comprises a movable contact 36a and stationary contacts 36b and 36c. The stationary contact 36b is connected to the solenoid 32 and the stationary contact 36c is connected to a control device 41. The control device is applied with signals from a front wheel speed sensor 39 and a rear wheel speed sensor 40 and detects the difference between both speeds. When the difference exceeds a predetermined value, which means that considerable slipping occurs, the control device 41 operates to close a circuit connecting the stationary contact 36c with the solenoid 32.

In normal operation, the manual switch 42 is closed. When the movable contact 36a of the manual change-over switch 36 is displaced to engage the stationary contact 36b, the solenoid 32 is energized to connect the gear 21 with the shaft 23. Thus, the power of the engine is always transmitted to all of the front and rear wheels. When the movable contact 36a is engaged with the stationary contact 36c, the control device 41 operates in dependency on the difference between front and rear wheel speeds and closes the circuit for the solenoid 32 upon occurrence of slipping. Thus, the front-wheel driving is automatically changed to four-wheel driving in accordance with the slipping rate of the wheels.

When the switch 42 is opened, the solenoid 32 is de-energized irrespective of speed differences or slipping of the wheels or conditions of road surface. Thus, the vehicle can be driven only by the front or main wheels. Therefore, various inspection of the vehicle can be carried out while fixing the rear wheels.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a power transmission system for a four-wheel drive vehicle powered by an engine, having a transmission for transmitting the power of said engine to main driving wheels of said four-wheel drive vehicle, a hydraulically operated clutch when engaged for transmitting the power of said engine to auxiliary driving wheels of the vehicle simultaneously with the transmitting by the transmission of the power of said engine to the main driving wheels, a hydraulic circuit for supplying oil to said hydraulically operated clutch, a solenoid operated valve provided in said hydraulic circuit, an electric circuit including a solenoid of said valve, sensors for detecting speeds of said main driving wheels and said auxiliary driving wheels, respectively, and control means automatically responsive to a predetermined difference between said speeds of said main driving wheels and said auxiliary driving wheels for closing said electric circuit so as to energize said solenoid so as to close said hydraulic circuit to engage said clutch, the improvement comprising means comprising a manually operated change-over switch for closing said electric circuit independent of said control means so as to energize said solenoid so as to close said hydraulic circuit to engage said clutch and simultaneously deactivating said control means from acting on said electric circuit, and means comprising a manual cut-off switch for disconnecting said electric circuit so as to deenergize said solenoid so as to open said hydraulic circuit to disengage said clutch during inspection of the vehicle when the main driving wheels are free and the auxiliary driving wheels are fixed although one of said control means and said change-over switch is actuated in a manner to engage said clutch.

2. The power transmission system according to claim 1, wherein
said clutch is a friction clutch.

3. The power transmission system according to claim 1, wherein
said control means is an electric control device.

4. The power transmission system according to claim 1, wherein
said manually operated change-over switch includes a first stationary contact connected to said solenoid enabling engagement of said clutch for providing the four-wheel drive, and a second stationary contact electrically connected to said solenoid through said control means enabling the four-wheel drive in response to said predetermined difference between said speeds of said main driving wheels and said auxiliary driving wheels, and a switch arm manually selectively connectable to said first and second stationary contacts, respectively, and
said manual cut-off switch is operatively connected in series with said switch arm.

5. In a power transmission system for a four-wheel drive vehicle powered by an engine, having a transmission for transmitting the power of said engine to main driving wheels of said four-wheel drive vehicle, a clutch when engaged for transmitting the power of said engine to auxiliary driving wheels of the vehicle simultaneously with the transmitting by the transmission of the power of said engine to the main driving wheels, the improvement in combination comprising sensors for detecting speeds of said main driving wheels and said auxiliary driving wheels, respectively, and control means automatically responsive to a predetermined difference between said speeds of said main driving wheels and said auxiliary driving wheels for engaging said clutch, means for manually engaging said clutch independent of and simultaneous inactivating said control means, and means comprising a manual cut-off switch for disengaging said clutch during inspection of the vehicle when the main driving wheels are free and the auxiliary driving wheels are fixed although one of said control means and said manually engaging means is actuated in a manner to engage said clutch.

6. The power transmission system according to claim 5, wherein said manually engaging means includes a first stationary contact operatively connected to said clutch enabling engagement of said clutch for providing the four-wheel drive, and a second stationary contact electrically operatively connected to said clutch through said control means enabling the four-wheel drive in response to said predetermined difference between said speeds of said main driving wheels and said auxiliary driving wheels, and a switch arm manually selectively connectable to said first and second stationary contacts, respectively, and said manual cut-off switch is operatively connected in series with said switch arm.

* * * * *